United States Patent
Mohanraju et al.

(12) 
(10) Patent No.: US 6,488,182 B1
(45) Date of Patent: Dec. 3, 2002

(54) PORTION CONTROL VERTICAL BIN

(75) Inventors: Sathish K. Mohanraju, Chattanooga, TN (US); George Mullinix, Signal Mountain, TN (US)

(73) Assignee: Brach's Confections, Inc., Chattanooga, TN (US)

(*) Notice: Subject to any disclaimer, the term of this patent is extended or adjusted under 35 U.S.C. 154(b) by 0 days.

(21) Appl. No.: 09/804,806

(22) Filed: Mar. 13, 2001

(51) Int. Cl.[7] .................................................. G01F 11/28
(52) U.S. Cl. ........................ 222/307; 222/438; 222/440; 222/447
(58) Field of Search ................................. 222/290, 305, 222/307, 308, 435, 438, 440, 447

(56) References Cited

U.S. PATENT DOCUMENTS

| | | | | |
|---|---|---|---|---|
| 249,464 A | * | 11/1881 | Farnham | 222/447 |
| 381,350 A | * | 4/1888 | Ehlers | 222/447 |
| 1,375,430 A | * | 4/1921 | Walker | 222/447 |
| 1,430,876 A | * | 10/1922 | Apfel | 222/447 |
| 1,469,879 A | * | 10/1923 | Bott | 222/440 |
| 1,844,260 A | * | 2/1932 | Nicolino | 222/440 |
| 4,645,036 A | | 2/1987 | Nestler | 186/55 |
| 4,779,521 A | * | 10/1988 | Brumfield | 444/447 |
| 5,361,945 A | | 11/1994 | Johanson | 222/145 |
| 5,730,333 A | | 3/1998 | Baulk | 222/181.3 |

* cited by examiner

Primary Examiner—Kenneth Bomberg
(74) Attorney, Agent, or Firm—Miller & Martin, LLP

(57) ABSTRACT

This invention discloses a portion control vertical bin for controlling the amount of material dispensed having a portion control device where a single handle pulls a top-slide and a bottom-slide where the top-slide separates a portion of material from the bulk material in the bin, the bottom-slide when pulled further releases the portioned material through an opening in the bottom-slide to a spout assembly where the portioned material may be collected in a receptacle.

16 Claims, 5 Drawing Sheets

PORTION CONTROL VERTICAL BIN

FIELD OF THE INVENTION

This invention relates to a bin employing a portion control device for regulating the quantity of material dispensed. The invention also relates to a bin that dispenses material on a first-in-first-out basis.

BACKGROUND OF THE INVENTION

Self serve dispensers have become increasingly popular throughout the country. These dispensers allow consumers to purchase select amounts of product by pouring bulk material from a storage bin into a receptacle, usually a paper bag provided by the retailer. In this way, consumers are not limited by prepackaged products, manufacturers need not prepackage their goods for purchase by the consumer, and grocery stores are able to stock more product in limited spaces. The dispensers are now widely accepted in the distribution and sale of coffee, candy, beans, nuts, bolts, nails and other products that are easily sold in loose form.

Among the most common dispensers currently employed in grocery stores is the upright bin which relies upon the force of gravity to dispense a product through a gated opening that is selectively opened and closed by a consumer. In use, the consumer generally places a bag beneath a gated outlet and opens the gate to release the items stored within the bin of the dispenser. Once the gate is opened, the product freely flows out of the bin, through the open gate and into the bag placed below the opening.

One problem with gates employed in such dispensers is that they rely upon a single barrier to control the flow of product from the bin. As a consequence when the gate is jostled even slightly, the bin outlet of the dispenser is opened and product begins to freely flow from the bin. Even slight movements of the gate are often enough to cause the product to flow freely. Often this causes the product to end up on the floor of the store as waste because the consumer may be unprepared for the immediate product flow. Even when consumers intentionally open the gate, they may be unprepared for pace of product flow. This is particularly the case when the bin is at capacity and the force pushing product through the open gate is highest. The result is an increased incidence of the consumer either overfilling their bag, or inadvertently spilling some of the goods flowing from the dispenser.

As such, a need exits for a dispenser capable of distributing loose items, while also providing a substantial amount of control to the consumer dispensing the product from the dispenser. The present invention provides a portion control device and dispensing system which provides such control to consumers.

SUMMARY OF THE INVENTION

It is, therefore, an object of the present invention to provide a portion control device including a top-slide and a bottom-slide for controlling the amount of material selected to be dispensed from a bin, of the type wherein the bin includes a spout assembly through which the material freely flows when a bottom-slide opening is pulled into position. The top-slide is connected to the bottom-slide by a spring. The bottom-slide has a handle that extends to the exterior of the bin. When the bottom-slide handle is pulled forward by a consumer both the top-slide and the bottom-slide move forward horizontally with respect to the bin. The lead-end of the top-slide cuts through the material in the bin and comes to rest on the interior face of the front bin wall blocking the material above the top-slide from moving downward to the spout assembly. The bottom slide-handle and the top-slide therefore form a chamber that holds a select amount of material. The bottom-slide continues to be pulled until an opening in the bottom-slide aligns with openings in the bottom of the portion chamber and the spout assembly. Product that is contained in the portion chamber may then be deposited in a receptacle.

It is also an object of the present invention to provide a portion control device where one wall of the portion chamber is adjustable. This feature of the invention allows the operator of the bin to control the amount of product dispensed at any one time. In addition certain items that have a tendency to adhere to one another may require a larger portion chamber to prevent the product from bridging the opening to the portion chamber.

It is also an object of the present invention to provide a flow regulator. The flow of product may be controlled by the size and shape of opening that is aligned with the portion chamber and the spout assembly. In addition, greater control of product flow stems from isolating a small portion of the contents of the bin effectively reducing the weight of product generating force acting to push product through the bottom-slide opening.

It is another object of the present invention to provide a dispensing mechanism for rotating product introduced to the bin on a first-in-first-out basis wherein the bin includes a wedge that directs product introduced to the bin to the portion chamber. The wedge descends from the rear wall of the bin to about the lead end of the top-slide and terminates at the portion control chamber. The position of the wedge allows newly introduced product to rest upon previously introduced product such that the previously introduced product must exit first through the spout assembly.

Other objects and advantages of the present invention will become apparent from the following detailed description when viewed in conjunction with the accompanying drawings, which set forth certain embodiments of the invention.

DETAILED DESCRIPTION OF THE INVENTION

Figure 1:
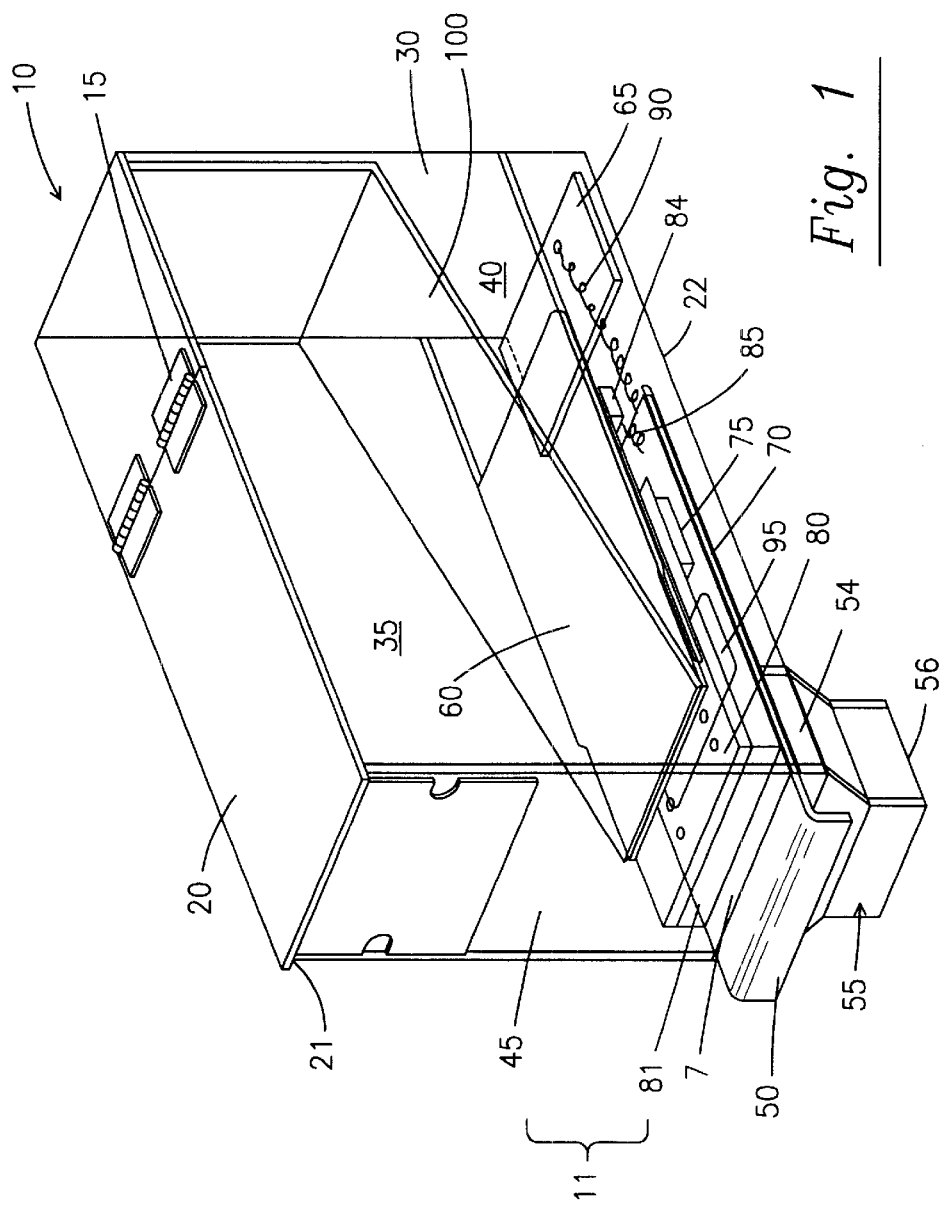
FIG. 1 is a perspective view of a dispensing mechanism employing a portion control device of the present invention.

With reference to FIG. 1, a portion control device 11 for the controlled dispensing of material stored within a bin 10 is disclosed. A typical rectangular bin 10 is illustrated with a front wall 45, rear wall 30, at either end of facing rear walls 35, 40, which receives goods from a top or superior opening 20 and dispenses those goods through the spout 55 by gravitational force.

The portion control device 11 is designed to control the amount of material captured in the portion chamber 7, by isolating a defined amount of product from the bulk of product in the bin 10.

Figure 2:
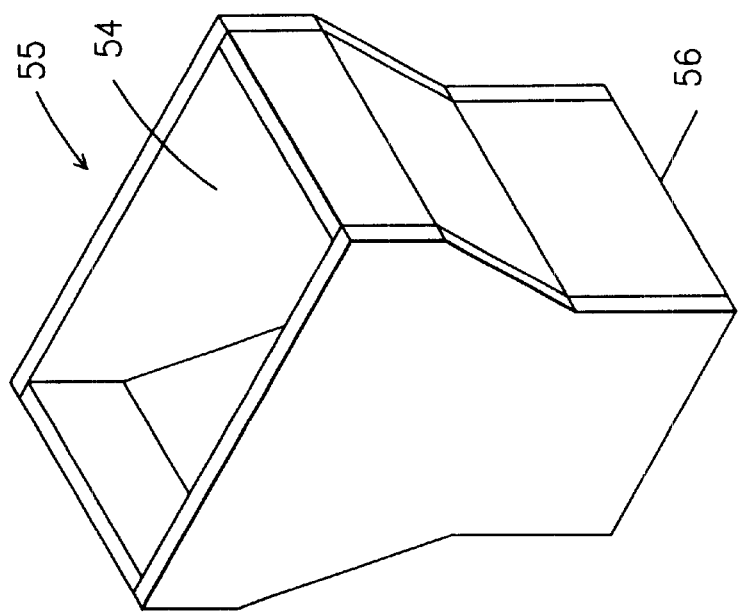
FIG. 2 is a perspective view of the spout assembly in isolation.
Figure 4A:
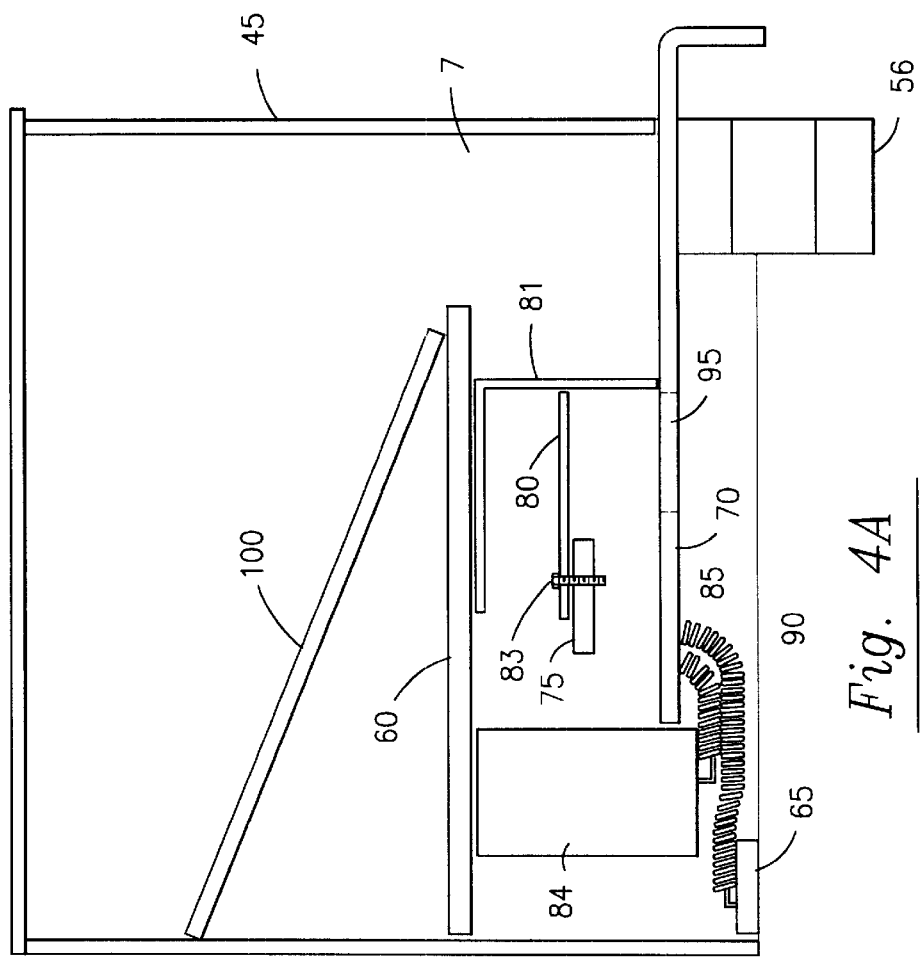
FIGS. 4A–4C are partial cross sectional views showing the portion control device as it moves between a closed position, an intermediate position, and an open controlled dispensing position.
Figure 4B:
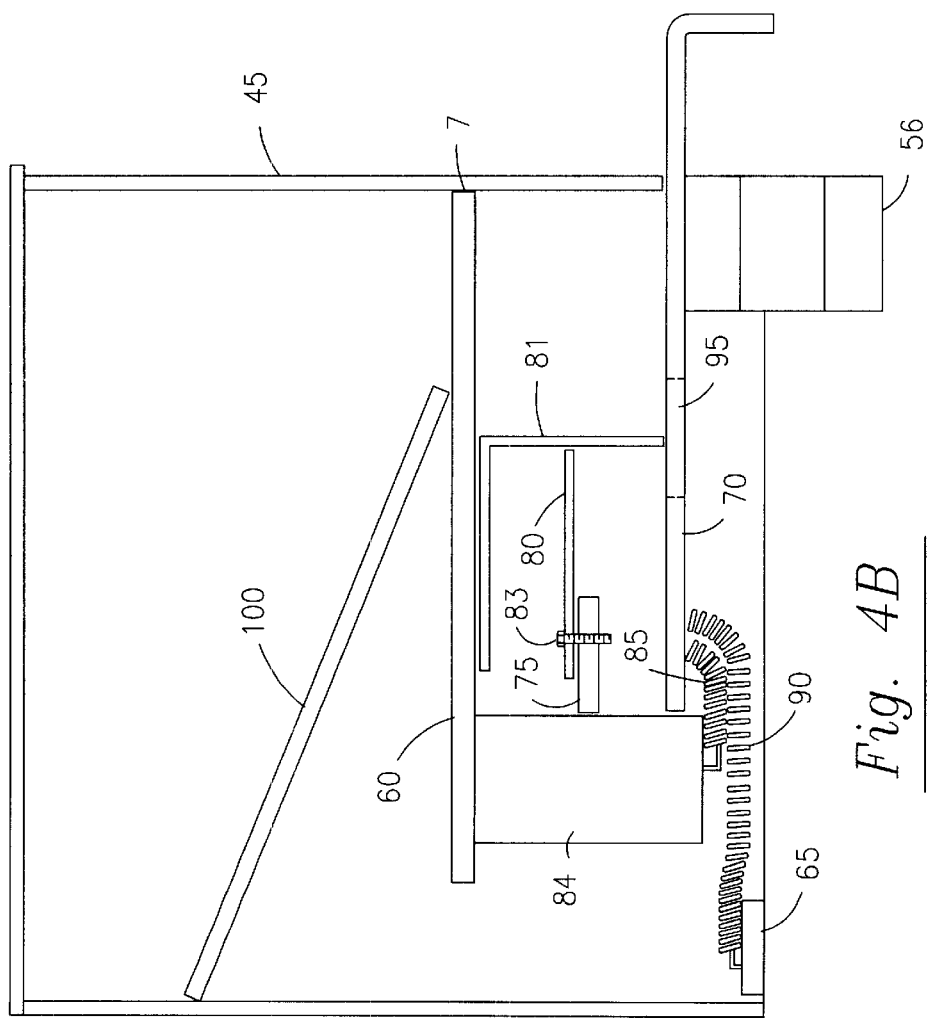
Figure 4C:
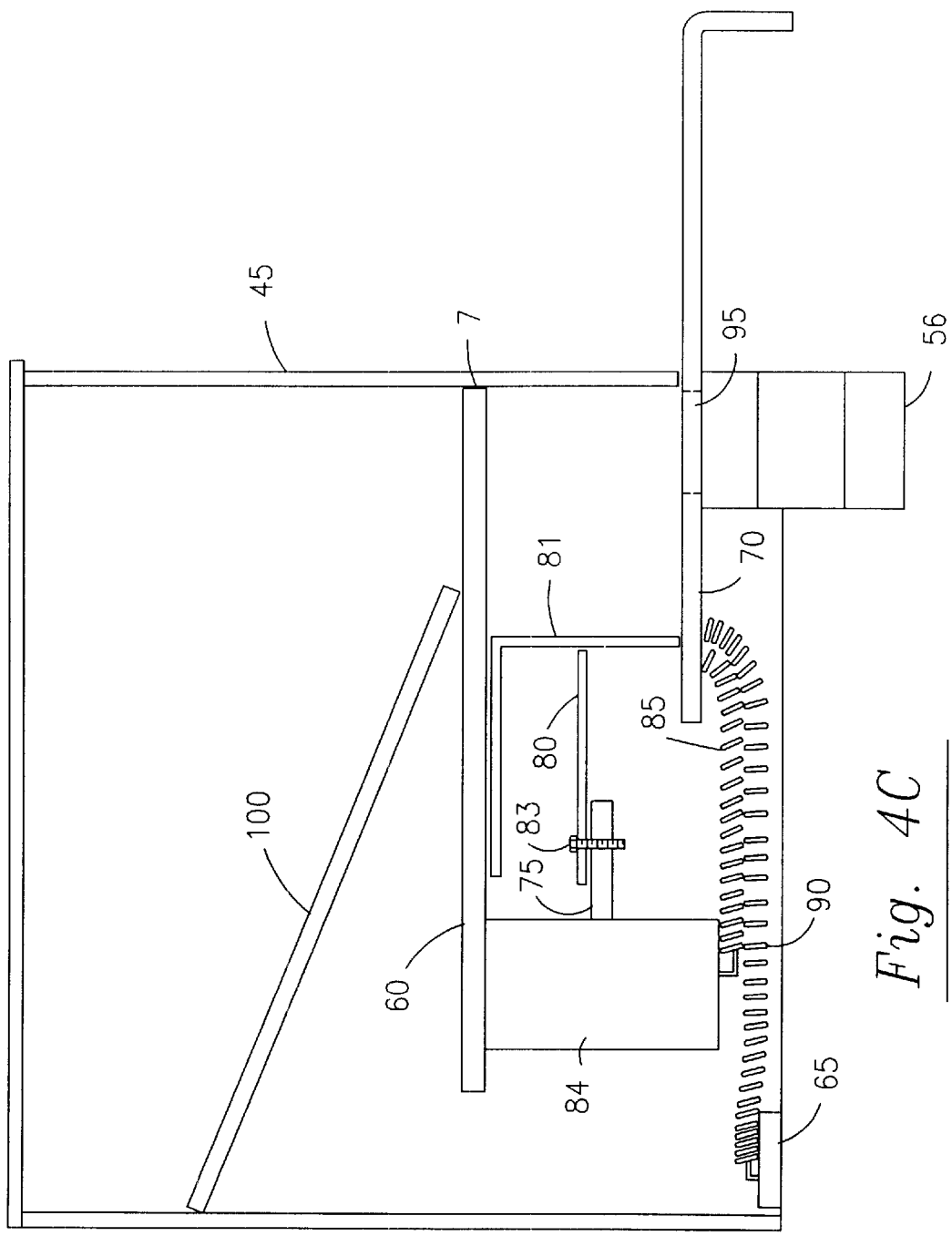

The portion control device 11 uses two moving parts, a top-slide 60 and a bottom-slide 70. The bottom-slide 70 is connected to a handle 50 extending to the exterior of the bin 10. When an operator pulls on the handle 50 both the top-slide 60 and the bottom-slide 70 move toward the front wall 45. The top-slide 60 comes into contact with the front wall 45 and forms the top of the portion chamber 7. As most clearly shown in FIG. 7B, the front wall 45, left side wall 35, right side wall 40, vertical flange 81 of the portion control adjustment plate 80 and bottom-slide 70 serve as the other walls of the portion chamber 7. In response to continued pulling on handle 50, the bottom-slide 70 continues to move forward after the top slide has contacted front wall 45. As best seen in FIG. 4C, this causes the bottom slide opening 95 on the bottom-slide 70 to move into the floor of the portion chamber 7. Once the bottom-slide opening 95 and the spout assembly inlet 54 are sufficiently aligned, material from the portion chamber 7 will flow through the spout assembly 55, shown in FIG. 2, to the spout assembly outlet 56 to finally be collected in a receptacle held beneath the spout 55. Therefore the portion control device 11 prevents the inadvertent flow of material from the bin by only allowing material to exit the bin 10 when the bottom slide opening 95 and the inlet 54 of the spout assembly 55 are substantially aligned. The top slide 60 also isolates the material in the body of the bin 10 from the portion control chamber 7 and spout assembly 55.

With further reference to FIG. 1, the bin 10 also contains wedge 100 to facilitate rotation of material through the bin on a first-in-first-out basis. As new material is added to the bin 10 through a superior opening such as lid 20 the wedge 100 acts as a ramp to direct material to the portion chamber 7. The last added goods may be at a level above the wedge 100. As material is dispensed from the bin 10 by using the portion control device 11, the portion chamber 7 is re-filled with material that was resting near the bottom of wedge 100. Material added later to the bin 10 subsequently descends along wedge 100 to a position close to the portion chamber 7. Eventually, operation of the bin 10 and portion control device 11 causes the material to descend into chamber 7 to be dispensed through the spout assembly 55. This wedge 100 structure, extends the entire length of the bin 10 and downward sloping to the front, near the opening of portion chamber 7 assures that added lots of bulk material are removed sequentially from the bin. Such a design is particularly useful when dispensing food goods to promote freshness.

Figure 3:
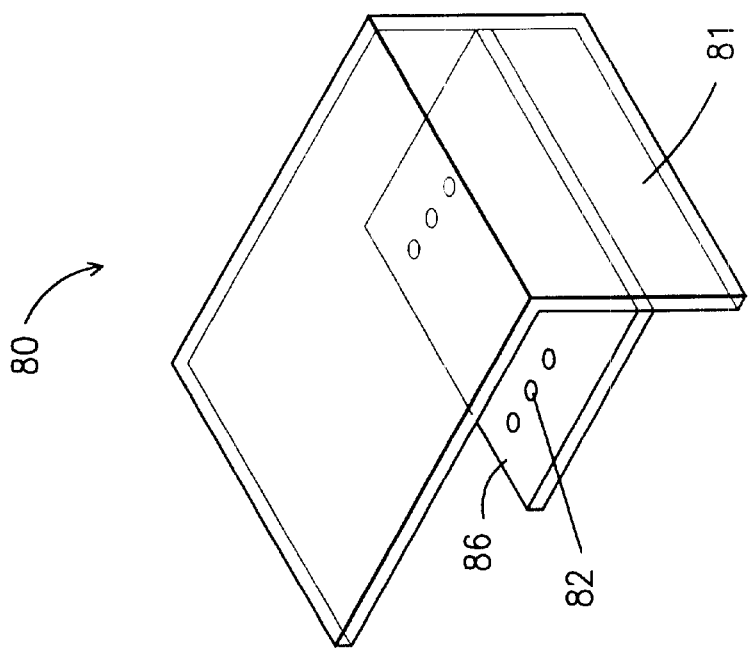
FIG. 3 is a perspective view of the portion control adjustment plate in isolation.

As stated above the vertical flange 81 of the portion control adjustment plate 80 serves as the rear wall of the portion chamber 7. The size of the portion chamber 7 can be adjusted by moving the portion control adjustment plate 80 and its vertical flange 81, toward or away from the front wall 45 of the bin 10. The portion control adjustment plate 80 is moved by placing adjustment holes 82 of adjusting flange 86, shown in FIG. 3, over receiving holes 76 on the portion control fixed plate 75, shown in FIG. 4, and fixing the position by inserting a lock nut 83 through both the adjusting hole 82 and the receiving hole 76, as shown in FIGS. 4A–4C. If the adjusting holes located farthest from the vertical flange 81 are used, the adjustment plate 80 and flange 81 are positioned forward and the portion chamber 7 has the smallest available volume. To increase the size of the portion chamber, holes closer to the vertical flange are used. In the preferred embodiment the holes are staggered such that material can be dispensed in a measured fashion. For instance, the first set of adjusting holes would correspond to ¼ lb of material and a next set of holes to ½ lb of material and so on in ¼ lb increments. Alternatively, the holes could pertain to volumes of material such as 2 cups, 4 cups and so on in 2 cup increments. An additional benefit of the adjustment plate 80 is that it allows the bin operator to customize the size of the portion chamber 7 for individual goods. Certain products may have a tendency to adhere to one another which causes a bridging effect that blocks the flow of product from the portion chamber 7 to the spout assembly 55. By increasing the size of the chamber 7 these products are allowed to pass unimpeded.

Referring now to FIG. 4A the bin 10 is seen from a side view where the handle 50 is in a relaxed position. In this position bottom-biasing member such as spring 90 and top-biasing member such as spring 85 are most relaxed. The bottom-slide spring 90 connects bottom brace 65, which is securely mounted to the bin 10, with the bottom-slide 70. In FIG. 4A the bottom-slide spring 90 provides tension as the handle 50 is pulled and tends to return the position of the handle and bottom slide 70 to the relaxed position once the handle 50 is released. The top-slide 60 is connected to the bottom slide 70 and handle 50 through top-slide spring 85. The top-slide spring connects to the top-slide 60 through slide connector 84. The slide connector 84 is securely attached to the top-slide 60. In FIG. 4B the handle 50 is pulled forward and the top-slide spring acts to bias the top-slide 60 into contact with front wall 45. This causes the top-slide 60 to form the top wall of portion cavity 7. Because the top slide 60 must be pulled through various material in the bin 10, the top-slide is advantageously made of a thin sheet of metal such as stainless steel. As the handle 50 is pulled to align the bottom-slide opening 95, with the spout 55, as seen in FIG. 4C, the top-slide spring 85 continues to stretch and hold the top-slide 60 firmly against the front wall. When the handle is released both the top-slide 60 and the bottom-slide 70 return to the relaxed position depicted in FIG. 4A.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A bin comprising:
   (a) a container having an exterior, an interior, a superior opening and an outlet;
   (b) a top-slide slidably attached to the interior of said container for dissecting the interior of the container into a first portion and a second portion;
   (c) a bottom-slide slidably attached to the container at a position beneath the topslide and having an opening therein;
   (d) a portion control adjustment plate adjustably fixed between said bottom-slide and said top-slide having a plurality of threaded adjusting holes for receiving a lock nut to couple the portion control adjustment plate with a portion control fixed plate wherein said fixed plate is attached to the containers;
   (e) a handle connected to the bottom slide and said bottom slide being connected to said top-slide;
   (f) wherein pulling of said handle moves the top-slide to dissect the interior of said container into the first and second portions and moves the bottom-slide to align the opening with the outlet, thereby permitting the second portion to communicate with the outlet.

2. The bin of claim 1 wherein the portion control adjustment plate has a vertical flange with a height substantially equal to the distance between said top-slide and said bottom-slide.

3. The bin of claim 2 wherein the second portion is a portion chamber defined by the top-slide as a top wall, the bottom slide as a bottom wall, the vertical flange as a rear wall, and the container as a front wall and two side walls.

4. The bin of claim 1 wherein the contents of the container are fed toward the outlet by a wedge above the top slide.

5. The bin of claim 1 wherein the portion control adjustment is adjustably fixed in a measured manner.

6. The bin of claim 1 wherein the portion control adjustment plate has a vertical flange with a height substantially equal to the distance between said top-slide and said bottom-slide.

7. A bin having: a superior opening with a lid having an overlapping rim, a front wall having an interior and exterior face, an opposing rear wall, at least two side walls connecting the front wall and opposing rear wall, and a bottom wall; and a spout assembly attached to the bottom wall having an inlet and an outlet; a portion control device for regulating the quantity of material dispensed from the bin, said portion control device comprising;

(a) a bottom-slide having an opening, said bottom-slide slidably attached to the, side walls and connected to a handle extending through said front wall;

(b) a top-slide positioned above said bottom-slide, slidably attached to the side walls and having a lead-end;

(c) a connector connecting the top-slide to the bottom-slide;

(d) a wedge extending from the rear wall downward to the lead-end of said top-slide, said wedge having a downward angle of at least 10°;

(e) a portion control adjustment plate adjustably fixed between said bottom-slide and said top-slide;

(f) said bottom-slide being retained in and returned to a closed position by a biasing member.

8. The bin of claim 7 wherein the portion control adjustment plate has a plurality of threaded adjusting holes for receiving a lock nut to couple the portion control adjustment plate with a portion control fixed plate and wherein said fixed plate and attached to at least one of the container walls.

9. The bin of claim 8 wherein the portion control adjustment plate is adjustably fixed in a measured manner.

10. The bin of claim 7 wherein the portion control adjustment plate has a vertical flange with a height substantially equal to the distance between said top-slide and said bottom-slide.

11. The vertical flange of claim 10 wherein said flange has a width substantially equal to the distance between said left side wall and said right side wall.

12. The bin of claim 7 wherein the bottom-slide opening is substantially rectangular in shape.

13. The bin of claim 7 wherein the bottom-slide opening has dimensions substantially equal to the spout assembly inlet.

14. A bin having:

(a) a superior opening with a lid having an overlapping rim;

(b) a front wall having an interior and exterior face;

(c) an opposing rear wall;

(d) at least two side walls connecting the front wall and opposing rear wall;

(e) a bottom wall;

(f) a spout assembly attached to the bottom wall having an inlet and an outlet;

(g) a portion control device for regulating the quantity of material dispensed from the bin, wherein said portion control device comprises:

(i) a top-slide having an open position and a closed position wherein the closed position partitions said bin into a first portion and a second portion;

(ii) a bottom-slide connected to said top-slide and said bottom slide having an opening therein;

(h) a portion control adjustment plate adjustably fixed between said bottom-slide and said top-slide to further define said second portion; and (i) a portion control fixed plate coupled to the portion control adjustment plate, said portion control fixed plate being attached to the container; and (ii) wherein the portion control device is moveable through a relaxed position, an intermediate position and an open position such that in the relaxed position the bottom-slide covers the spout assembly inlet and the top slide is in its open position, in the intermediate position the bottom slide covers the spout assembly inlet and the top slide is in its closed position, and in the open position, the spout assembly inlet is aligned with the opening in the bottom slide and the top slide is in its closed position.

15. The bin of claim 14 wherein the portion control adjustment plate is adjustably fixed in a measured manner.

16. The bin of claim 14 wherein the bottom-slide opening has dimensions substantially equal to the spout assembly inlet.

\* \* \* \* \*